US 8,013,868 B2

(12) United States Patent
Sasaki

(10) Patent No.: US 8,013,868 B2
(45) Date of Patent: Sep. 6, 2011

(54) COLOR PROCESSING APPARATUS, COLOR PROCESSING METHOD, COLOR GAMUT SETTING APPARATUS, COLOR GAMUT SETTING METHOD, RECORDING MEDIUM STORING COLOR PROCESSING PROGRAM AND RECORDING MEDIUM STORING COLOR GAMUT SETTING PROGRAM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1359 days.

(21) Appl. No.: 11/581,396

(22) Filed: Oct. 17, 2006

(65) Prior Publication Data

US 2007/0165252 A1 Jul. 19, 2007

(30) Foreign Application Priority Data

Jan. 17, 2006 (JP) ................ P2006-009291

(51) Int. Cl.
*G09G 5/02* (2006.01)
(52) U.S. Cl. ........ 345/590; 345/589; 345/591; 345/600; 345/603; 345/605; 382/167
(58) Field of Classification Search .......... None
See application file for complete search history.

(56) References Cited

U.S. PATENT DOCUMENTS

| 4,812,899 A | 3/1989 | Kueppers |
| 6,100,999 A | 8/2000 | Ikegami |
| 6,437,792 B1 * | 8/2002 | Ito et al. ........... 345/600 |
| 7,164,498 B2 * | 1/2007 | Van Bael ........... 358/1.9 |
| 7,483,169 B2 * | 1/2009 | Murakami ........... 358/1.9 |
| 7,573,607 B2 * | 8/2009 | Huan et al. ........... 358/1.9 |
| 2001/0035968 A1 | 11/2001 | Higashikata et al. ...... 358/1.9 |
| 2005/0052670 A1 | 3/2005 | Nishikawa |
| 2005/0244055 A1 | 11/2005 | Ok et al. |

FOREIGN PATENT DOCUMENTS

| JP | 10-262157 | 9/1998 |
| JP | 2001-136401 | 5/2001 |
| JP | 2002-10096 A | 1/2002 |
| JP | 2002-84434 | 3/2002 |
| JP | 2005-59361 | 3/2005 |
| JP | 2005-176280 | 6/2005 |
| JP | 2005-205812 | 8/2005 |
| JP | 2005-223608 A | 8/2005 |
| KR | 10-2005-0105643 | 11/2005 |

* cited by examiner

*Primary Examiner* — Antonio A Caschera
(74) *Attorney, Agent, or Firm* — Morgan, Lewis & Bockius LLP

(57) ABSTRACT

A color processing apparatus converts a target M-dimensional color signal in an input color space into an N-dimensional output color signal in an output color space. M and N are natural numbers and N>M. The apparatus includes a first calculation unit and a second calculation unit. The first calculation unit uniquely calculates (N−M) colorants of the converted output color signal from the target color signal with using plural color-signal pairs. In each pair, corresponding one of the (N−M) colorants of an output color signal in the output color space are associated with an input color signal in the input color space. The second calculation unit calculates the M colorants of the converted output color signal from the target color signal and the (N−M) colorants of the converted output color signal.

24 Claims, 12 Drawing Sheets

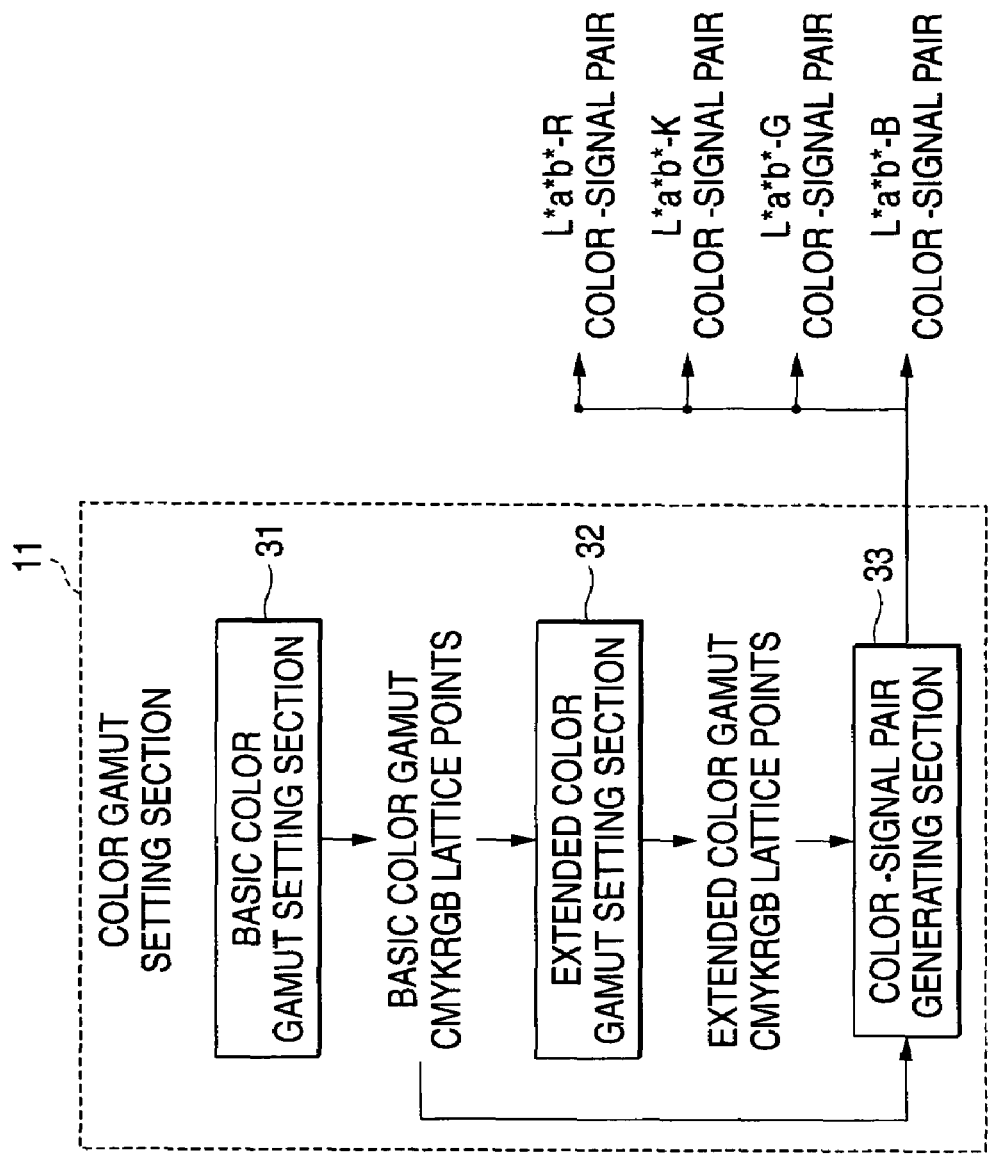

COLOR PROCESSING APPARATUS, COLOR PROCESSING METHOD, COLOR GAMUT SETTING APPARATUS, COLOR GAMUT SETTING METHOD, RECORDING MEDIUM STORING COLOR PROCESSING PROGRAM AND RECORDING MEDIUM STORING COLOR GAMUT SETTING PROGRAM

BACKGROUND

1. Technical Field

The invention relates to a color processing technique for converting a target M-dimensional color signal in an input color space into an N-dimensional output color signal (N>M) in an output color space.

2. Related Art

To express colors by a color output device, inputted color signals (input color signals) need to be converted into coloring materials (output color signals) included in the color output device. Input color signals are often color signals called colorimetric color signals such as L*a*b* and XYZ or standardized color signals such as sRGB and sYCbCr. In most cases, output color signals contain primary colorants such as C (cyan), M (magenta) and Y (yellow), and extra colorants such as K (black) In such cases, input color signals must be converted into output color signals with a larger number of dimensions.

Generally, to convert input color signals into output color signals with a larger number of dimensions, the number of unknown quantities of the output color signals needs to be matched with the number of known quantities of the input color signals. For example, to convert an input color signal of L*a*b* (hereinafter L*a*b* will be described as an example) into an output color signal of CMYK, any one of CMYK needs to be decided in advance. In this case, there is often used a method for deciding CMY on the basis of L*a*b* and K after deciding K on the basis of L*a*b* to reduce the number of unknown quantities from 4 to 3.

To decide CMY on the basis of L*a*b* and K, a color conversion model for converting CMYK into L*a*b* can be used. As the color conversion model, a color conversion model called "black box model" or a color conversion model called "physical model" is used. In the black box model, unknown colors are decided statistically on the basis of pairs of data CMYK and L*a*b* as calorimetric values of CMYK. Examples of the black box model are color transmission characteristic prediction methods described in JP Hei. 10-262157 A (corresponding to U.S. Pat. No. 6,100,999) and JP 2002-84434 A, and known scientific methods using neural networks. In the physical model, unknown colors are calculated on the basis of overlapping of coloring materials. Examples of the physical model are known scientific techniques such as a Neugebauer physical model.

When the model is F, an expression for converting CMYK into L*a*b* is given as follows.

$$(L^*, a^*, b^*) = F(C, M, Y, K) \quad \text{(Expression 1)}$$

When inversion of the model is $F^{-1}$, conversion of L*a*b* into CMYK can be given as follows.

$$(C, M, Y) = F^{-1}(L^*, a^*, b^*, K) \quad \text{(Expression 2)}$$

On this occasion, a method for deciding K is important. In most cases, K is expressed in a function of L*a*b* as follows.

$$K = f(L^*, a^*, b^*) \quad \text{(Expression 3)}$$

For use of the expression 3, it is necessary to calculate a maximum value of K (=Kmax) enough to reproduce a color of L*a*b* and a minimum value of K (=Kmin) necessary to reproduce the same color of L*a*b*. For example, Kmax and Kmin can be obtained by searching a range of $0 \leq K \leq 100$. Moreover, K to be used may be controlled in a range of $Kmin \leq K \leq Kmax$ by a function $f_K$ in accordance with input L*a*b*. For example, parameters of the function $f_K$ in use of the expression 3 can be decided in accordance with the setting of image quality in such a manner that K is brought close to Kmin when a*b* is large (i.e. chromaticness is high) and K is brought close to Kmax when a*b* is small (i.e. chromaticness is low).

An example of conversion of L*a*b* into CMYK in the case where a color signal of L*a*b* is input to a color output device and a color signal of CMYK is output from the color output device has been described above. An example of separation into coloring materials CMYKRGB in the case where the output color signal contains extra colorants R (red), G (green) and B (blue) in addition to the primary colorants CMY and the extra colorant K will be described below.

When the output color signal of the color output device includes extra colorants K (black), R (red), G (green) and B (blue) for extending a color gamut allowed to be reproduced by the device, in addition to the primary colorants C (cyan), M (magenta) and Y (yellow), a problem in conversion cannot be solved by decision of K. The problem is not simple. Various techniques from an easy technique to a complex technique have been proposed for deciding extra colorants KRGB.

The technique described in U.S. Pat. No. 4,812,899 is a technique generally called "Kueppers Technique". This technique converts RGB into CMYKRGB by replacing RGB components with CMYK components in accordance with the degree of overlapping of components of an input color signal when the input color signal is an RGB signal obtained from a scanner with respect to a color output device which outputs a color signal including colorants CMYKRGB. Although this technique is so simple that it is easy to put this technique into practice, the color gamut of the output device cannot be used sufficiently and calorimetric color matching can hardly be made.

When the technique is applied to the case where the input color signal is L*a*b*, CMY may be separated into KRGB in accordance with the degree of overlapping of CMY calculated after L*a*b* is converted into CMY (uniquely decided because of conversion of three dimensions into three dimensions). The problem in insufficient use of the color gamut and difficulty of calorimetric color matching however occurs in this case like the case where the input color signal is RGB.

On the other hand, JP Hei. 2001-136401 A has described a technique called "dividing method". When, for example, the color gamut of the output device is expressed in CMYKRGB, the color gamut is divided into color gamuts each expressed in four colorants, such as a color gamut expressed in YMCK, a color gamut expressed in YMRK, etc. Models are applied to the split color gamuts respectively as follows.

The case where a color gamut expressed in YMCKR is divided and modeled will be described as an example. First, a YMCK color gamut can be given by the expression:

$$(Y, M, C) = F_{YMCK}^{-1}(L^*, a^*, b^*, K) \quad \text{(Expression 5)}$$

in accordance with the expression:

$$(L^*, a^*, b^*) = F_{YMCK}(Y, M, C, K) \quad \text{(Expression 4)}$$

in which $F_{YMCK}$ is a color conversion model for the YMCK color gamut. Similarly, a YMRK color gamut can be given by the expression:

$$(Y, M, R) = F_{YMRK}^{-1}(L^*, a^*, b^*, K) \quad \text{(Expression 7)}$$

in accordance with the expression:

$$(L*,a*,b*)=F_{YMRK}(Y,M,R,K) \quad \text{(Expression 6)}$$

in which $F_{YMRK}$ is a color conversion model for the YMRK color gamut.

In the case of G or B, the color gamut can be divided and modeled in the same manner as the expressions 6 and 7.

The dividing method warrants calorimetric reproducibility in the split color gamuts. Moreover, the split color gamuts can be used sufficiently. It is however difficult to warrant color continuity in a boundary between the YMCK color gamut and the YMRK color gamut because models are selected in accordance with the values of L*a*b*. For this reason, there is a great deal of possibility that a pseudo surface will be generated in an image when a table of color conversion of L*a*b into CMYKRGB is generated by the aforementioned method and applied to an output device. As measures to solve this problem, a technique for smoothing the color conversion table has been described in JP 2001-136401 A. Although color continuity can be improved by smoothing, calorimetric reproducibility is lowered.

As described above, in the dividing method described in JP 2001-136401 A, it is difficult to balance color continuity with calorimetric reproducibility.

As another technique, a method for extending a CMYK system given by the expressions 1 to 3 has been described, for example, in JP 2005-176280 A. An exemplary embodiment of this technique has been described in the case of a six color system of CMYKRG as an example. Conversion of CMYKRG into L*a*b* is given by the expression:

$$(L*,a*,b*)=F(C,M,Y,K,R,G) \quad \text{(Expression 8)}$$

in which F is a model given for the CMYKRG system in the same manner as in the expression 1.

When the expression 2 is extended, inversion of the expression 8 can be given as follows.

$$(C,M,Y)=F^{-1}(L*,a*,b*,K,R,G) \quad \text{(Expression 9)}$$

A technique for generating KRG is further required because it is necessary to decide KRG before inversion is performed by the expression 9. Therefore, a maximum value of K (=Kmax) enough to reproduce L*a*b* and a minimum value of K (=Kmin) necessary to reproduce L*a*b* must be calculated by retrieval in the same manner as in the case of the CMYK system, and values of Rmax, Rmin, Gmax and Gmin must be retrieved likewise. Because these values are not uniquely decided with respect to L*a*b* so that the values of Rmax, Rmin, Gmax and Gmin vary in accordance with the value of K even in the same L*a*b*, a complex process is required.

Therefore, in JP 2005-176280 A, RG are fixed (R=0, G=0) and only retrieval of Kmax and Kmin from L*a*b* is performed first. The values of Kmax and Kmin calculated thus and K activity $\alpha_K$ are used for deciding K as follows.

$$K=\alpha_K \cdot Kmax+(1-\alpha_K)Kmin \quad \text{(Expression 10)}$$

Then, K calculated by the expression 10 is fixed and a maximum value Rmax of R enough to reproduce L*a*b* and a minimum value Rmin of R necessary to reproduce L*a*b* are retrieved. After Rmax and Rmin are calculated, R activity $\alpha_R$ is used for deciding R as follows in the same manner as the expression 10.

$$R=\alpha_R \cdot Rmax+(1-\alpha_R)Rmin \quad \text{(Expression 11)}$$

Finally, K and R calculated by the expressions 10 and 11 are fixed and a maximum value Gmax of G enough to reproduce L*a*b* and a minimum value Gmin of G necessary to reproduce L*a*b* are retrieved. After Gmax and Gmin are calculated, G activity $\alpha_G$ is used for deciding G as follows in the same manner as the expression 10 or 11.

$$G=\alpha_G \cdot Gmax+(1-\alpha_G)Gmin \quad \text{(Expression 12)}$$

When KRG calculated thus and L*a*b* are applied to the expression 9, CMY can be calculated. K activity $\alpha_K$, R activity $\alpha_R$ and G activity $\alpha_G$ in the expressions 10, 11 and 12 can be changed in accordance with the values of L*a*b* as follows.

$$\alpha_K=U_K(L*,a*,b*) \quad \text{(Expression 13)}$$

$$\alpha_R=U_R(L*,a*,b*) \quad \text{(Expression 14)}$$

$$\alpha_G=U_G(L*,a*,b*) \quad \text{(Expression 15)}$$

When, for example, $U_K$ in the expression 13 is a function for outputting a value which increases as a*b* decreases, K can be used frequently for a color of low chromaticness. When $U_R$ in the expression 14 is a function for outputting a value which increases as a*b* increases in a red direction, the color gamut can be used sufficiently in the red direction. The same rule can also apply to the expression 15.

As described above, the technique disclosed in JP 2005-176280 A can solve the problems of the Kueppers Technique disclosed in U.S. Pat. No. 4,812,899 and the dividing technique disclosed in JP 2001-136401 A, so that colorants CMYKRGB can be generated continuously (without any discontinuous point) while calorimetric reproduction can be performed for the output device containing primary colors CMY and extra colors KRGB.

In the technique disclosed in JP 2005-176280 A, a great deal of time is however required for retrieving Kmax, Kmin, Rmax, Rmin, Gmax and Gmin. Generally, a model as given by the expressions 8 and 9 is often used for colorimetric reproduction. When, for example, the width of retrieval of K is 256 gradations, the expressions 8 and 9 must be repeated 256 times to calculate Kmin and Kmax. After K is fixed, the expressions 8 and 9 must be further repeated 256 times to retrieve Rmax and Rmin. After KR are fixed, the expressions 8 and 9 must be further repeated 256 times to retrieve Gmax and Gmin. That is, the solution of the expressions 8 and 9 must be repeated 256×3 times in total. It is to be understood that the number of times is enormous even in the case where a model easy in solution is used. When the model used is a nonlinear model such as a neural network model, a nonlinear optimizing method etc. is applied to the solution of the expression 9 but it is known that a great deal of processing time is required for the nonlinear optimizing method. It is also to be understood that the technique can hardly be used in practice in terms of processing time when extra colorants such as B are added to CMYKRG, because the number of times for retrieval must be increased in accordance with the addition of the extra colorants.

In the technique disclosed in JP 2005-176280 A, there is no consideration for the case where the total amount of coloring materials in the output device is limited. For example, assume that the limited total amount is 300% in the output device using six colorants CMYKRG. Assume that the dot area ratio of each color material of CMYKRG is in a range of from 0 to 100%. Assume that the total amount of CMYKRG calculated by the technique disclosed in JP 2005-176280 A is 350% (e.g. C=50%, M=50%, Y=50%, K=100%, R=50% and G=50%). On this occasion, a method for keeping the ratios of respective colorants simply to set the total amount of the colorants to 350% or a method for retrieving CMYKRG to minimize color differences may be conceived to set CMYKRG in the limited total amount. In the former method, color differences however increase so greatly that colorimetric color reproduction is spoiled. In the latter method, continuity of CMYKRG becomes an issue. Moreover, a greater deal of retrieval time is required for minimizing color differences within the limited total amount.

As a further technique for deciding extra colorants, for example, a method for converting RGB into YMCKRGB and adjusting colorants in accordance with functions with respect to lightness, chromaticness and hue while maximizing extra colorants with respect to a color of maximum chromaticness which can be reproduced in two of the three colors YMC has been disclosed in JP 2005-59361 A (corresponding to US 2005/0052670A). Also in this technique, color continuity can be kept. Moreover, conversion of actually input RGB into YMCKRGB can be processed speedily because application of the functions is required merely.

For application of this technique, it is however necessary to set the functions appropriately. There is no way but the experimental way of deciding the functions because the functions cannot be set theoretically. For this reason, not only enormous processing is required for deciding the functions but also it is unknown whether the decided functions are optimal or not. This is due to the fact that seven parameters cannot be uniquely decided from three parameters as described above. In JP 2005-59361 A (corresponding to US 2005-0052670A), there is a problem that extra colors cannot be uniquely decided because the number of functions allowed to be set is infinite, and extra colors vary in accordance with the setting of the functions.

A technique for deciding CMYKRGB from RGB by applying a simple function uniformly has been described in JP 2005-205812 A. Particularly, a technique for extending a color gamut by reducing the amounts of extra colors in a low-lightness portion to prevent lowering of chromaticness of the low-lightness portion when extra colors are used has been described in JP 2005-205812 A. In color conversion due to application of the simple function as described in JP 2005-205812A, color consistency cannot be warranted so that it is very difficult to set the function for the same reason as in the technique described in JP 2005-59361 A (corresponding to US 2005/0052670 A) when color consistency is considered.

In the foregoing examples, all of the related art and limitations related thereto are intended to be illustrative and not exclusive. Other limitations of the related art will become apparent to those skilled in the art on a reading of the specification and a study of the drawings.

SUMMARY

According to an aspect of the invention, a color processing method converts a target M-dimensional color signal in an input color space into an N-dimensional output color signal in an output color space. M and N are natural numbers and N>M. The method includes: uniquely calculating (N−M) colorants of the converted output color signal from the target color signal with using plural color-signal pairs, in each pair, corresponding one of the (N−M) colorants of an output color signal in the output color space are associated with an input color signal in the input color space; and calculating the remaining M colorants of the converted output color signal from the target color signal and the (N−M) colorants of the converted output color signal calculated.

BRIEF DESCRIPTION OF THE DRAWINGS

Embodiments of the present invention will be described in detail based on the following figures, wherein:

FIG. 4 is a block diagram showing a specific example of the color gamut setting section;

DETAILED DESCRIPTION

Figure 1:
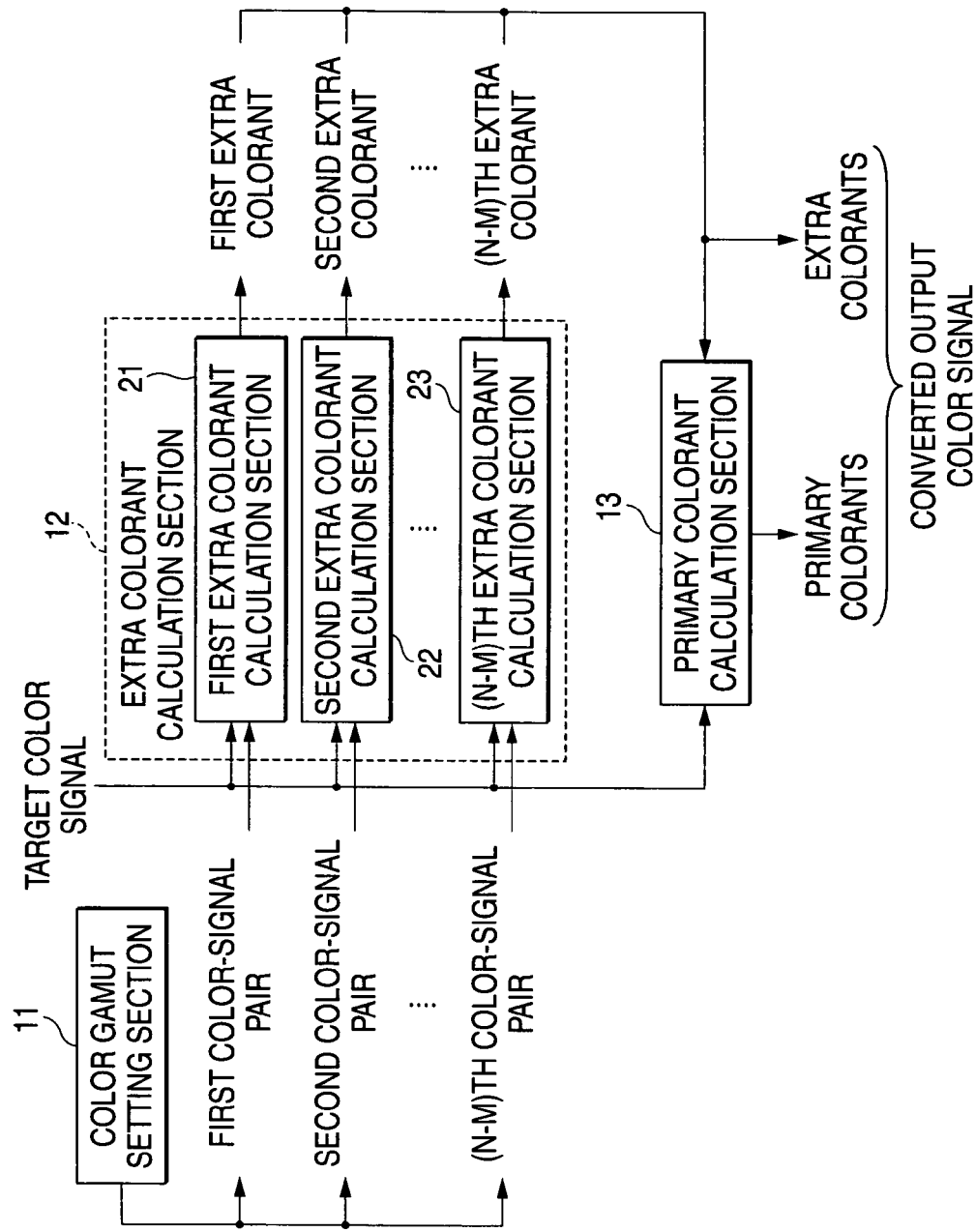
FIG. 1 is a block diagram showing an exemplary embodiment of the invention.

FIG. 1 is a block diagram showing an exemplary embodiment of the invention. In FIG. 1, the reference numeral 11 designates a color gamut setting section; 12, an extra colorant calculation section; 13, a primary colorant calculation section; and 21 to 23, first to (N−M)th extra colorant calculation sections. In this exemplary embodiment, a target color signal in an M-dimensional input color space is converted into an output color signal in an N-dimensional output color space (M<N). Generally, a solution of conversion of M dimensions into N dimensions (M<N) cannot be calculated unless (N−M) variables are obtained. Therefore, in the exemplary embodiment, at first, among N colorants of the output color signal, (N−M) colorants are calculated for an M-dimensional target color signal. Then, the remaining M colorants of the output color signal are calculated on the basis of the obtained (N−M) colorants of the output color signal and the target color signal.

The color gamut setting section 11 sets a color gamut in the output color space, the color gamut in which the (N−M) colorants of the output color signal in the output color space can be uniquely associated with the input color signal in the input color space. The color gamut setting section 11 associates the (N−M) colorants of the output color signal with the input color signal contained in the color gamut set in the output color space, and calculates pairs of respective components and input colorants as color-signal pairs. Let the (N−M) colorants be a first colorant, a second colorant, . . . an (N−M)th colorant, respectively. Let the color-signal pairs of the obtained colorants be a first color-signal pair, a second color-signal pair . . . , an (N−M)th color-signal pair, respectively.

The extra colorant calculation section 12 calculates the (N−M) colorants of the output color signal on the basis of the target color signal uniquely with using the first color-signal pair, the second color-signal pair . . . the (N−M)th color-signal pair. In each of the first color-signal pair, the second color-signal pair . . . the (N−M)th color-signal pair set by the color gamut setting section 11, corresponding one of the (N−M) colorants of the output color signal is uniquely associated with the input color signal. The extra colorant calculation section 12 includes (N−M) extra colorant calculation sections for the respective colorants to be calculated. Although only a first extra colorant calculation section 21, a second extra colorant calculation section 22 and an (N−M)th extra colorant calculation section 23 are shown in FIG. 1, the other extra colorant calculation sections are not shown for the sake of convenience.

The first extra colorant calculation section 21 calculates a first extra colorant on the basis of the target color signal by referring to the first color-signal pair calculated by the color gamut setting section 11. The second and (N−M)th extra colorant calculation sections 22 and 23 calculate second and (N−M)th colorants respectively in the same manner as described above. In each of the first to (N−M)th extra colorant calculation sections 21 to 23, a color conversion model is generated by use of corresponding one of the color-signal pairs, so that the first to (N−M)th colorants can be uniquely calculated on the basis of the target color signal by use of the color conversion models.

The primary colorant calculation section 13 calculates the remaining M colorants (primary colorants) of the N-dimensional output color signal on the basis of the target color signal and the first colorant, the second colorant, . . . , the (N−M)th colorant calculated by the (N−M) colorant calculation sections 21 to 23 of the extra colorant calculation section 12. Because the (N−M) colorants of the output color signal have been already calculated, it is necessary to calculate the remaining M colorants of the output color signal. The remaining M colorants of the output color signal to be calculated can be decided uniquely because the remaining M colorants are calculated on the basis of the already calculated (N−M) colorants of the output color signal and the M colorants of the given target color signal.

In the configuration shown in FIG. 1, the color gamut setting section 11 needs to calculate the first to (N−M)th color-signal pairs before a color conversion process is performed on the target color signal. Conversely, if the first to (N−M)th color-signal pairs have been already calculated, the color gamut setting section 11 becomes unnecessary when the color conversion process is performed on the target color signal. Accordingly, for example, the color gamut setting section 11 may be formed as a color gamut setting apparatus provided separately. In this case, the first to (N−M)th color-signal pairs obtained by this color gamut setting apparatus may be input to a color processing apparatus, which includes the extra colorant calculation section 12 and the primary colorant calculation section 13. If the extra colorant calculation section 12 generates color conversion models on the basis of the first to (N−M)th color-signal pairs in advance, the first to (N−M)th color-signal pairs become unnecessary when the color conversion process is actually performed on the target color signal.

Figure 2:
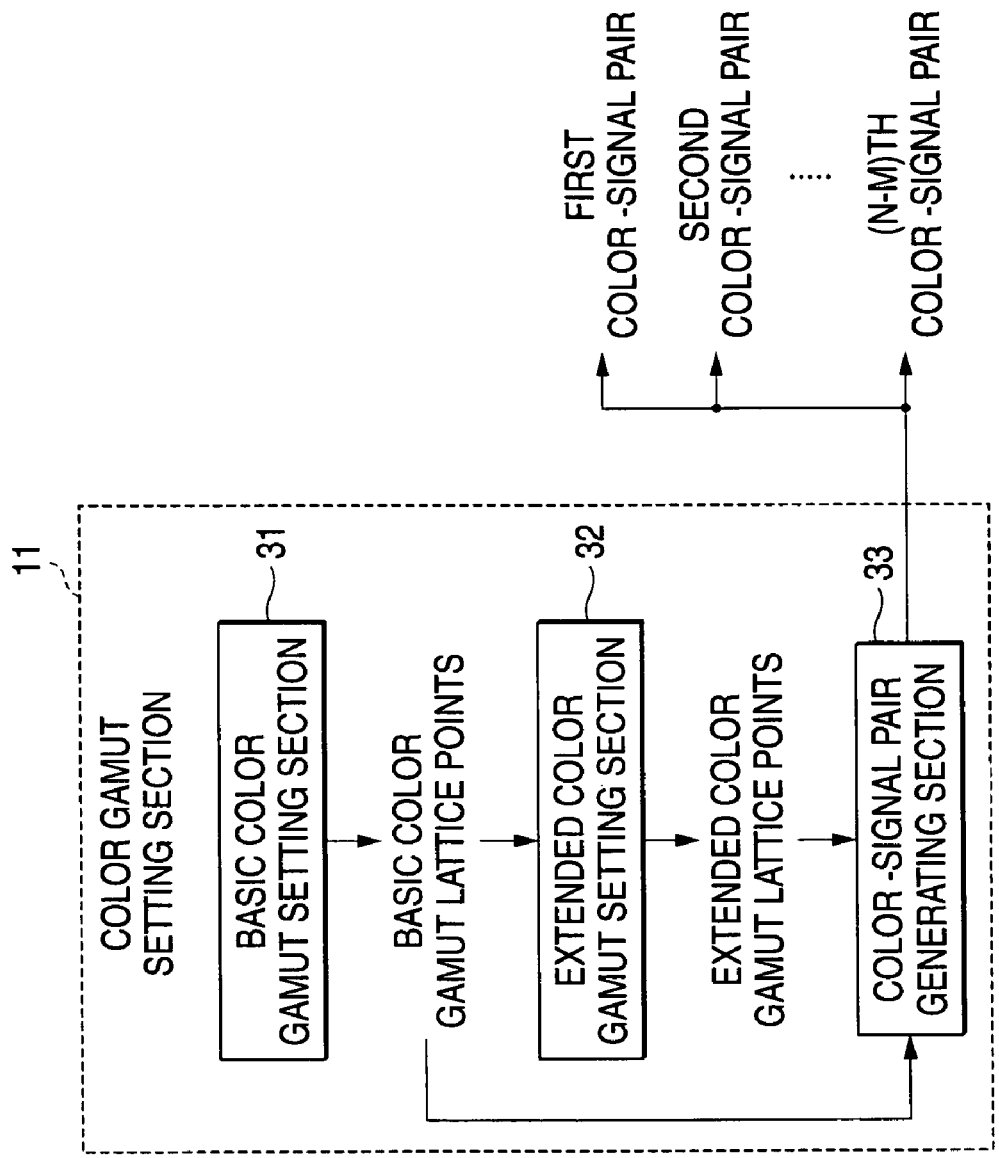
FIG. 2 is a block diagram showing an example of a color gamut setting section.

FIG. 2 is a block diagram showing an example of the color gamut setting section 11. In FIG. 2, the reference numeral 31 designates a basic color gamut setting section; 32, an extended color gamut setting section; and 33, a color-signal pair generating section. For example, as shown in FIG. 2, the color gamut setting section 11 may include a basic color gamut setting section 31, an extended color gamut setting section 32, and a color-signal pair generating section 33.

The basic color gamut setting section 31 sets a basic color gamut by associating a value of each extra colorant of the output color signal with the input color signal corresponding to a color in an allowable range of values, which primary colorants of the output color signal can take. The basic color gamut can be set freely to obtain target image quality. For example, the basic color gamut may be set so that values of extra colorants increase as values of primary colorants increase. Incidentally, in this exemplary embodiment, the basic color gamut setting section 31 sets the basic color gamut so that the phase of the input color signal corresponding to the output color signal represented by only primary colorants is kept. This is because plural sets of extra colorants would correspond to a single input color signal in the resultant basic color gamut unless extra colorants are set while the phase of the input color signal corresponding to the output color signal represented by only primary colorants is kept.

Such associating may be performed for all combinations of values, which can be taken by primary colorants. However, it is practical that such associating is performed for combinations of values of colorants obtained at regular intervals. The combinations of values on this occasion are referred to as lattice points here. When the basic color gamut setting section 31 sets the basic color gamut by associating the input color signal corresponding to each lattice point with the respective extra colorants corresponding to the same lattice point, the basic color gamut setting section 31 generates the output color signal whose extra colorants correspond to the lattice point represented by the primary colorants. These lattice points are referred to as basic color gamut lattice points. From the aforementioned process of generating the basic color gamut lattice points, extra colorants of the output color signal are uniquely associated with the input color signal.

Incidentally, when it is necessary to limit the total amount of coloring materials in the output device, the sum of colorants of the output color signal may be set to satisfy the limited total amount. In this manner, according to this exemplary embodiment, the total amount of coloring materials may be limited when the color gamut is set.

The basic color gamut lattice points set by the basic color gamut setting section 31 can keep continuity of extra colorants with respect to continuity of primary colorants. However, the basic color gamut thus set may not utilize a reproducible color gamut well. Therefore, the extended color gamut setting section extends the basic color gamut to set an extended color gamut.

The extended color gamut setting section 32 sets the extended color gamut by increasing extra colorants or decreasing primary colorants from the surface of the basic color gamut set by the basic color gamut setting section 31 so that extra colorants uniquely correspond to the input color signal. Because the basic color gamut setting section 31 uses lattice points in a range of values, which can be taken by primary colorants, the extended color gamut setting section 32 extends the color gamut by further increasing extra colorants for lattice points representing the surface of the color gamut among the basic color gamut lattice points. When it is necessary to limit the total amount of coloring materials in the output device, extra colorants may be increased up to the limited total amount.

The output color signals generated thus by increasing extra colorants from values of the basic color gamut lattice points are referred to as "extended color gamut lattice points." The extended color gamut is expressed by the extended color gamut lattice points and the basic color gamut lattice points. Because the extended color gamut lattice points are output color signals generated by monotonically increasing extra colorants from the surface of the basic color gamut, plural sets of extra colorants never correspond to a single input color signal corresponding to an output color signal expressed by an extended color gamut lattice point. Accordingly, like the case of the basic color gamut, values of corresponding one of extra colorants are uniquely associated with respective input color signals.

The color-signal pair generating section 33 first converts all output color signals, which are expressed by the basic color gamut lattice points and the extended color gamut lattice points, into input color signals. For example, a color conversion model as represented by the aforementioned numerical expression 1 or 8 may be used in this conversion. The color-signal pair generating section 33 associates each input color signal after subjected to this conversion with a set of extra colorants of an output color signal, which is a conversion source and corresponds to the input color signal, so as to generate a first color-signal pair, a second color-signal pair, . . . an (N–M)th color-signal pair.

As described above, the color gamut setting section 11 sets the color gamut in which values of corresponding one of extra colorants of the output color signals uniquely correspond to the input color signals. Therefore, the color gamut setting section 11 calculates pairs in each of which values of corresponding one of extra colorants of the output color signals are associated with the input color signals.

Figure 3:
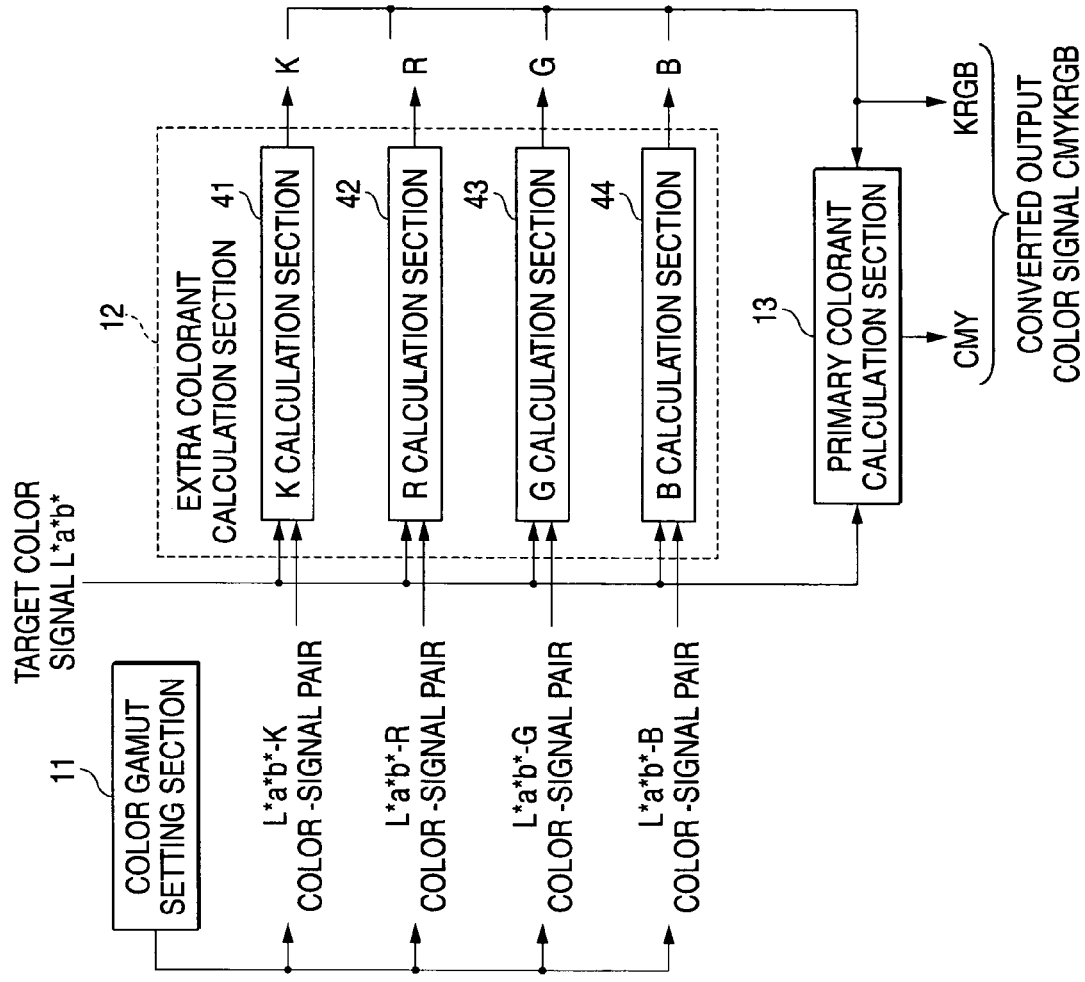
FIG. 3 is a block diagram showing a specific example in the exemplary embodiment of the invention.

FIG. 3 is a block diagram showing a specific example of this exemplary embodiment of the invention. FIG. 4 is a block diagram showing a specific example of the color gamut setting section 11. In FIG. 3, the reference numeral 41 designates a K calculation section; 42, an R calculation section; 43, a G calculation section; and 44, a B calculation section. For example, here is shown the case where the output color space of the color output device has seven dimensions of CMYKRGB whereas the input color space is a calorimetric color space L*a*b*. That is, here is shown the case where M and N in FIG. 1 are equal to 3 and 7, respectively. In the colorants in the output color space, C, M and Y are primary colorants and K, R, G and B are extra colorants. Of course, in this exemplary embodiment, any input color space and any output color space may be used and any primary colorants and any extra colorants may be set. For example, the extra colorants may include orange (O) and purple (P).

Before color conversion of the target color signals, the color gamut setting section 11 calculates the first color-signal pair, the second color-signal pair, . . . the (N–M)th color-signal pair in the aforementioned manner. Because the extra colorants are K, R, G and B here, the color gamut setting section 11 generates an L*a*b*-K color-signal pair, an L*a*b*-R color-signal pair, an L*a*b*-G color-signal pair and an L*a*b*-B color-signal pair as signal pairs in which respective extra colorants are associated with the input color signals.

Figure 5A:
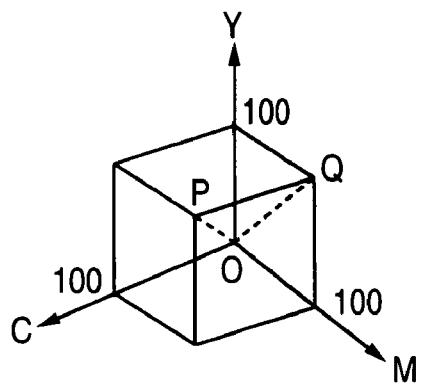
FIGS. 5A and 5B are graphs for explaining a range of values allowed to be taken by CMY colorants.
Figure 5B:
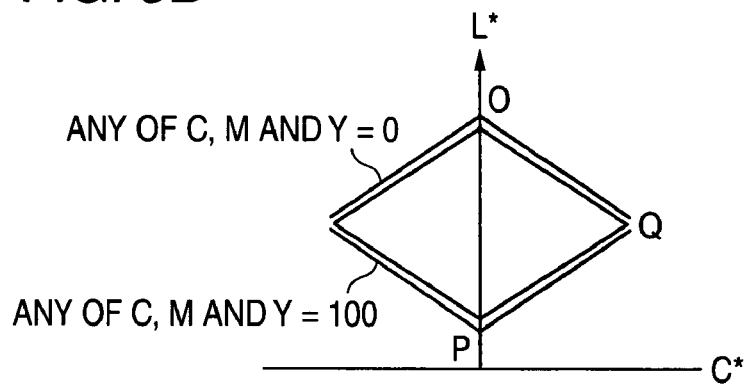

The basic color gamut setting section 31 sets a basic color gamut by associating values of the extra colorants KRGB with CMY lattice points in a range of values, which can be taken by the primary colorants CMY. FIGS. 5A and 5B are graphs for explaining allowable ranges of values of the colorants CMY. FIG. 5A shows the range of all values, which can be taken by CMY in the CMY color space (i.e. the color gamut in the CMY color space). FIG. 5B shows a color gamut in the L*a*b* color space, which corresponds to the color gamut in the CMY color space. Incidentally, in FIG. 5B, a*b* is expressed as one axis C*.

It is assumed that values, which can be taken by each of colorants of the output color signals, express dot area ratios of coloring materials, and that the values are in a range of from 0% to 100%. Point P is a point of C=M=Y=100(%) and expresses the darkest point in the L*a*b* color space. Point Q is a point of Y=M=100 and C=0 and expresses the reddest point in the L*a*b* color space. When the points O, P and Q in the CMY color space are shown in the color gamut in the L*a*b* color space, the graph schematically shown in FIG. 5B is obtained.

Figure 6:
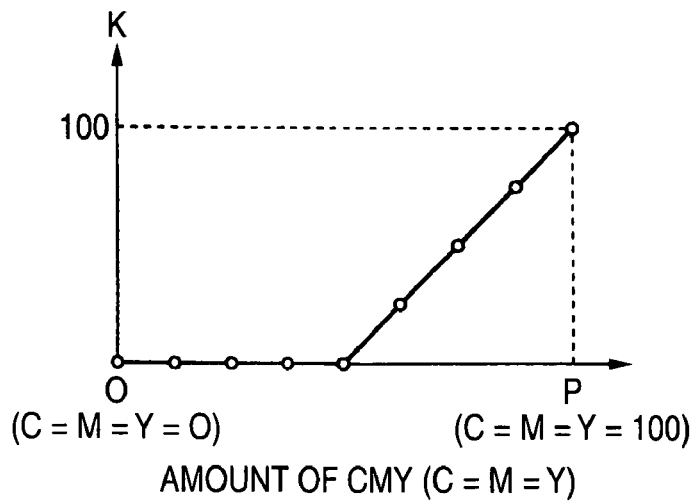
FIG. 6 is a graph showing an example of change in K in accordance with change in CMY.

FIG. 6 is a graph showing an example of change in K in accordance with change in CMY. Generally, to improve image quality, K is frequently used in low-lightness achromatic regions whereas primary colors and extra colors are frequently used in high-chromatic regions. For example, the values of K may be set as shown in FIG. 6 at lattice points on a line connecting points OP in the CMY color space shown in FIG. 5A (which correspond to OP on the axis L* in the L*a*b* color space shown in FIG. 5B). That is, the values of K are set so that the value of K is fixed to zero when the lightness is higher than a certain value whereas the values of K are increased slowly when the lightness is not higher than the certain value. As a result, K can be used more frequently as the lightness decreases. Because K is increased (lightness is lowered) in accordance with increase in CMY (lowering of lightness), inversion of gradations in L*a*b* never occurs. The prevention of inversion of gradations is referred to as "phase conservation."

Figure 7:
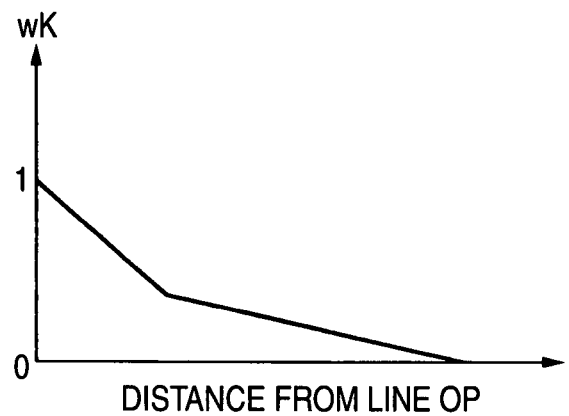
FIG. 7 is a graph showing an example of the relation between the distance from a line OP and weighting for K.

FIG. 7 is a graph showing an example of a relation between a distance from the line OP and weighting of K. As described above, the values of K are set to small values in a high-chromatic region. As the distance from the line connecting OP in FIGS. 5A and 5B increases, the chromaticness increases. Accordingly, lattice points, which are not on the line OP, can be set so that the values of K set in FIG. 6 are decreased, for example, with using weighting wK as shown in FIG. 7. When, for example, this weighting wK is used and K for lattice points on the line OP is $K_{OP}$, K for lattice points, which are not on the line OP in the CMY color space, can be set in accordance with the following expression.

$$K = wK \cdot K_{OP} \quad \text{(Expression 16)}$$

According to the numerical expression 16, if a difference between CMY is increased (increase in distance from the line OP; increase in chromaticness in the L*a*b* color space), K is decreased (increase in chromaticness). Accordingly, inversion never occurs in the L*a*b* color space (phase conservation). Here, the "difference between CMY" may be calculated by any of the following expressions.

$$\max(C,M,Y) - \min(C,M,Y)$$

$$C - (M+Y)/\alpha \; (\alpha : \text{constant})$$

Figure 8:
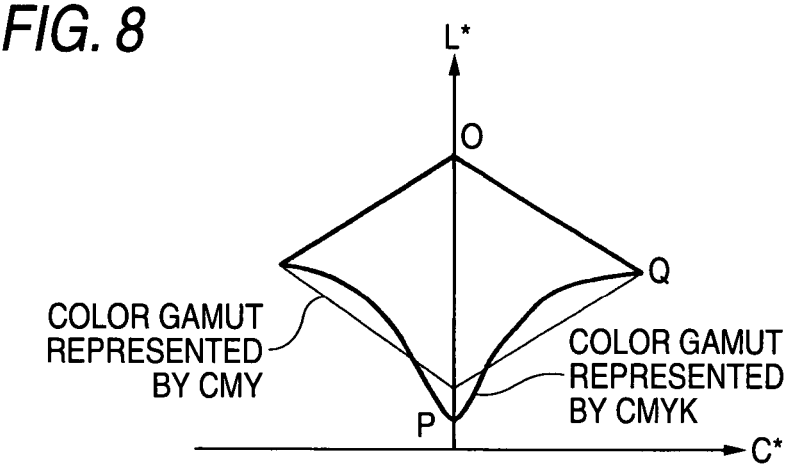
FIG. 8 is a graph for explaining an example of a color gamut in an $L^*a^*b^*$ color space, of an output color signal including CMY and K.

FIG. 8 is a graph for explaining an example of the color gamut of the output color signals including CMY and K, in the L*a*b* color space. When the color gamut of the output color signals including (i) the lattice points CMY and (ii) K, which is set to correspond to CMY, is drawn in the L*a*b* color space in the aforementioned manner, a thick-line shown in FIG. 8 is obtained. Incidentally, a thin-line shown in FIG. 8 represents the color gamut of CMY shown in FIG. 5B. It is obvious from FIG. 8 that addition of K lowers lightness of the point P in the L*a*b* color space to thereby extend the color gamut on the low lightness side.

The case where K is added to CMY has been described above. Since K is one of extra colorants, the same method can be applied to the other extra colorants. Setting of an extra color R will be described below as an example. Incidentally, K for lattice points in the CMY color space is regarded as a fixed point after K is once set in the aforementioned manner.

In the above description, FIG. 8 is used for the purpose of facilitating understanding of the exemplary embodiment. It is noted that the basic color gamut setting section 31 assigns K to respective lattice points in the CMY color space without converting into the L*a*b* color space any of the lattice point in the CMY color space or a combination of the lattice point in the CMY color space and K assigned thereto.

Figure 9:
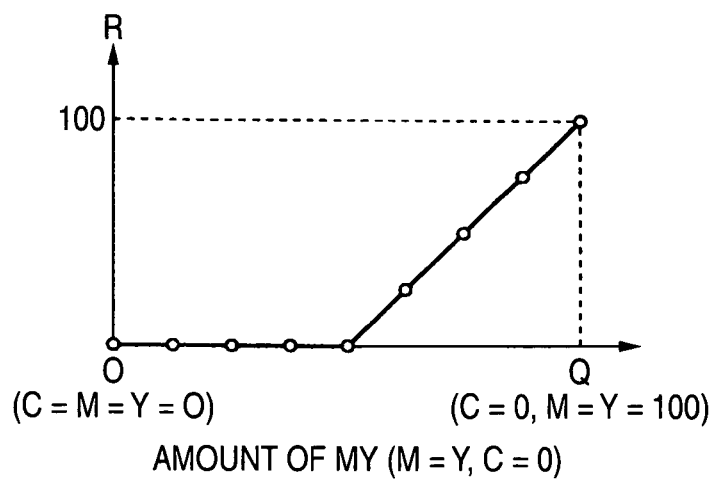
FIG. 9 is a graph showing an example of change in R in accordance with change in MY.
Figure 10:
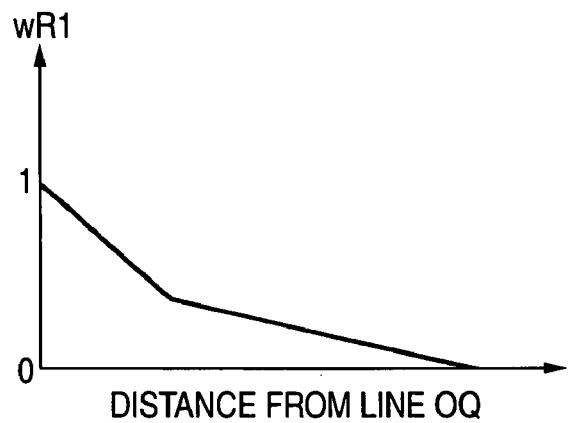
FIG. 10 is a graph showing an example of the relation between the distance from a line OQ and weighting for R.

FIG. 9 is a graph showing an example of change in R in accordance with change in MY. FIG. 10 is a graph showing an example of a relation between a distance from the line OQ and weighting of R. Generally, the extra color R can be most frequently used in the case of Y=M=100. Therefore, R may be set as shown in FIG. 9, for example, for lattice points on the line OQ in the CMY color space shown in FIG. 5A. The extra color R varies in the hue in accordance with the distance from the line OQ. Accordingly, R may be decreased with using weighting wR1 as shown in FIG. 10 in the same manner as in the case of setting of K.

Figure 11:
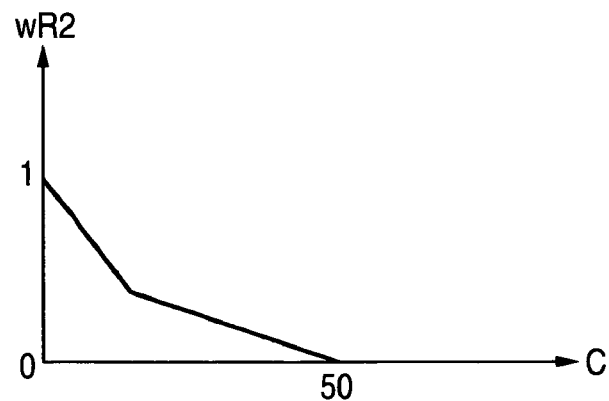
FIG. 11 is a graph showing an example of the relation between change in C and weighting for R.

FIG. 11 is a graph showing an example of a relation between change in C and weighting of R. As described above, the extra color R may be changed in the same manner as K. On the other hand, the extra color R is different from K in that it is preferable that R decreases as C, which is the opposite color to R, increases. To reflect this characteristic, weighting wR2 may be used for obtaining further decrease in R in accordance with increase in C as shown in FIG. 11. In FIG. 11, C of the lattice points in the CMY color space are set so that R becomes zero completely in the case of C=50.

When the weighting wR1 shown in FIG. 10 and the weighting wR2 shown in FIG. 11 are used and, for example, R for lattice points on the line OQ is referred to as $R_{OQ}$, R for lattice points, which are not on the line OQ in the CMY color space, may be obtained by the following expression.

$$R = wR1 \cdot wR2 \cdot R_{OQ}$$ (Expression 17)

Figure 12:
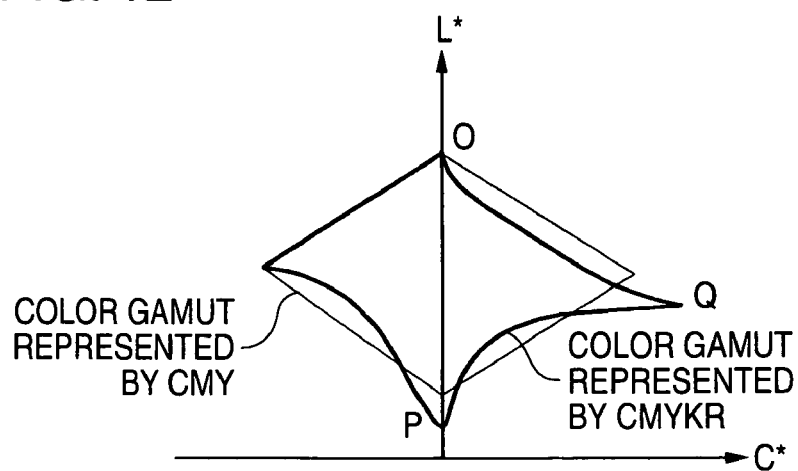
FIG. 12 is a graph for explaining an example of a color gamut in an $L^*a^*b^*$ color space, of an output color signal including CMY, K and R.

FIG. 12 is a graph for explaining an example of the color gamut of the output color signals including CMY, K and R in the L*a*b* color space. When K for lattice points CMY are set as described above and R are further set, the color gamut of the output color signals in the L*a*b* color space is obtained as shown in FIG. 12. It is obvious from FIG. 12 that setting of R in addition to setting of K extend the point Q in the L*a*b* color space, that is, extend the color gamut toward the high-chroma side (in the red direction on this occasion).

Although description has been made in the case where R are set, the description may apply to the case of setting of G and B. In the case of G, G may be set so that G can be used best at C=Y=100. In the case of B, B may be set so that B can be used best at C=M=100. Because G and B may be set in the same manner as R, detailed description thereon will be omitted.

The basic color gamut setting section 31 of the color gamut setting section 11 sets extra colorants KRGB with respect to lattice points in the CMY color space as described above. Then, the basic color gamut setting section 31 sets basic color gamut CMYKRGB lattice points, which are output color signals generated from these colorants. A color gamut, which can be reproduced by the basic color gamut CMYKRGB lattice points, is set as the "basic color gamut". In the basic color gamut, continuity of extra colors KRGB is warranted with respect to continuity of CMY.

As is obvious from FIGS. 8 and 12, the reproducible color gamut is not used well though it is possible to extend the minimum lightness point and the maximum chromaticness point. This is because setting of K with respect to CMY reduces the color gamut of low lightness in the achromatic direction with respect to the color gamut expressed by the three colors CMY as is obvious from FIG. 8 and because setting of R with respect to CMY reduces the color gamut of high lightness in the low-brightness direction as is obvious from FIG. 12.

Figure 13:
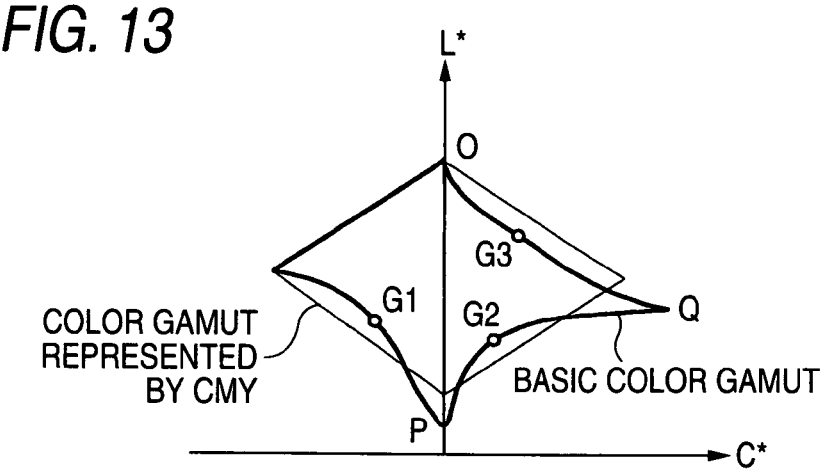
FIG. 13 is a graph for explaining an example of points on the surface of a basic color gamut.
Figure 14:
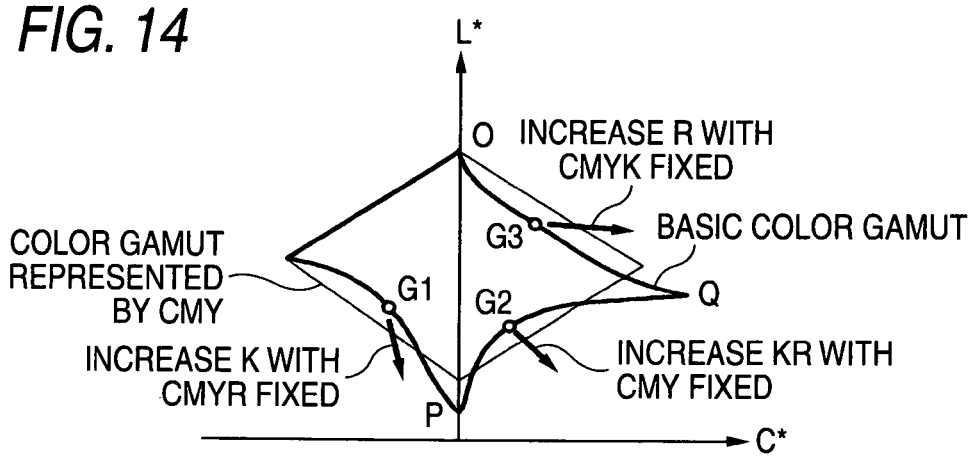
FIG. 14 is a graph for explaining an example of a method for extending the surface of the basic color gamut.

Therefore, the extended color gamut setting section 32 further extends the color gamut from the surface of the basic color gamut. FIG. 13 is a graph for explaining an example of points on the surface of the basic color gamut. FIG. 14 is a graph for explaining an example of a method for extending the surface of the basic color gamut. In FIG. 13, the thick line shows the basic color gamut, which is shown in FIG. 12 and set by the basic color gamut setting section 31. Points G1, G2 and G3 on the surface of the basic color gamut are shown in FIG. 13. The point G1 is on a surface, which is expressed by C=100. The point G2 is on a surface, which is expressed by either M or Y=100. The point G3 is on a surface, which is expressed by C=0.

Figure 15:
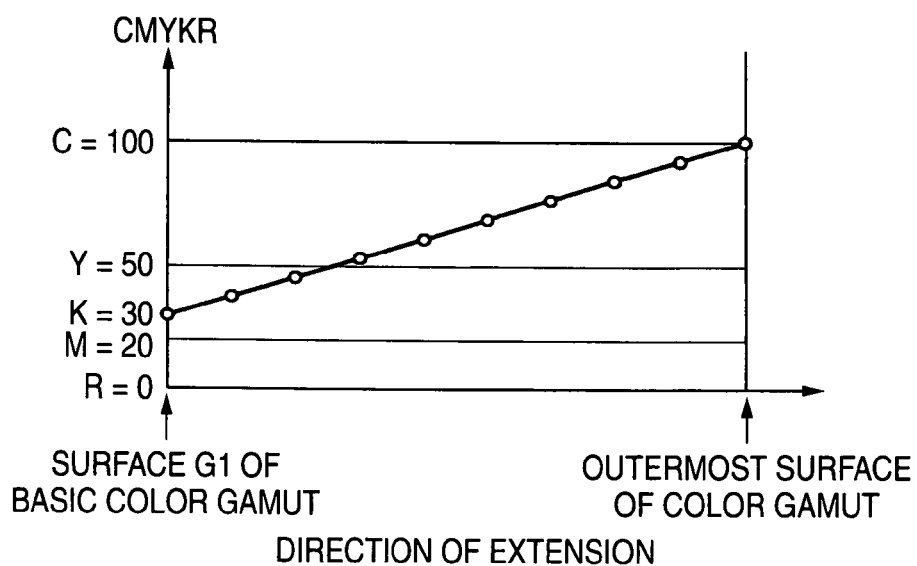
FIG. 15 is a graph for explaining a specific example of the method for extending the basic color gamut by increasing K.

The color gamut regarding the point G1 can be further extended by using K. When, for example, K is increased from the point G1, the color gamut can be extended as represented by an arrow in FIG. 14 (see the arrow in the vicinity of the point G1). FIG. 15 is a graph for explaining a specific example of the method for extending the basic color gamut by increasing K. In the specific example, the point G1 is set at (C, M, Y, K, R)=(100, 20, 50, 30, 0) and K is increased from K=30 to K=100 on the condition that points C, M, Y and R are fixed. An increasing state of K on this occasion is shown in FIG. 15. The outermost surface of the color gamut allowed to be extended can be obtained at K=100. Values of other colorants than K at the point G1 are shown in the graph of FIG. 15.

Figure 16:
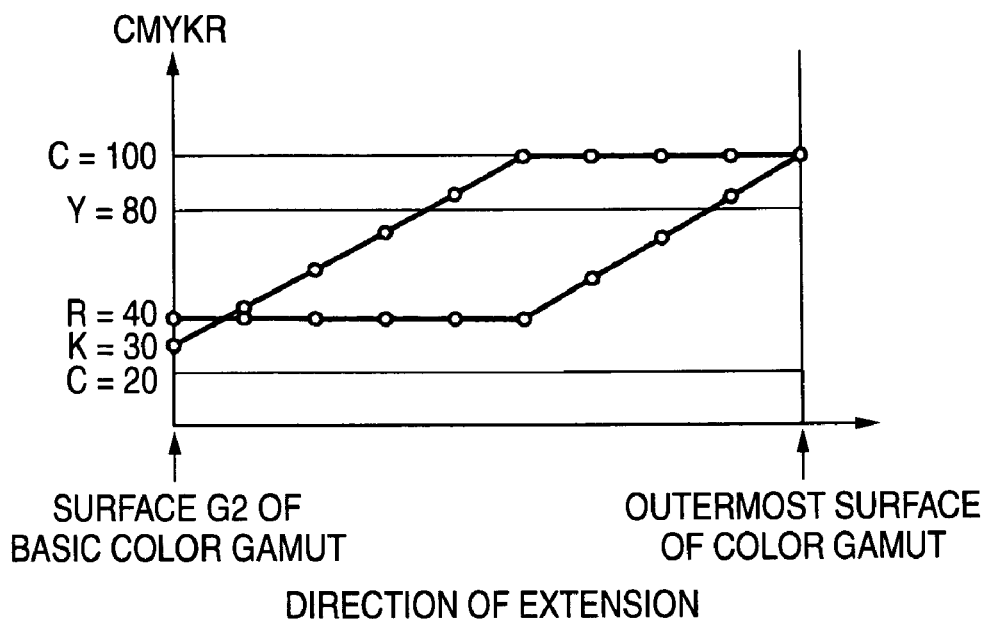
FIG. 16 is a graph for explaining a specific example of the method for extending the basic color gamut by increasing K and R.

The color gamut regarding the point G2 can be further extended by using K and R. When, for example, K and R are increased from the point G2, the color gamut can be extended as represented by the arrow extending from the point G2 in FIG. 14. FIG. 16 is a graph for explaining a specific example of the method for extending the basic color gamut by increasing K and R. In the specific example, the point G2 is set at (C, M, Y, K, R)=(20, 100, 80, 30, 40) and K and R are increased from K=30 to K=100 and from R=40 to R=100, respectively on the condition that C, M and Y are fixed. Increasing states of K and R on this occasion are shown in FIG. 16. When K is increased, the color gamut is extended in the achromatic direction. When R is increased, the color gamut is extended in the chromaticness increasing direction. On this occasion, there is a possibility that the input color signal corresponding to the output color signal in the extended color gamut will exhibit one and the same L*a*b* value when K and R are increased simultaneously. Therefore, as shown in FIG. 16, while one of K and R is increased, the other may be fixed.

Figure 17:
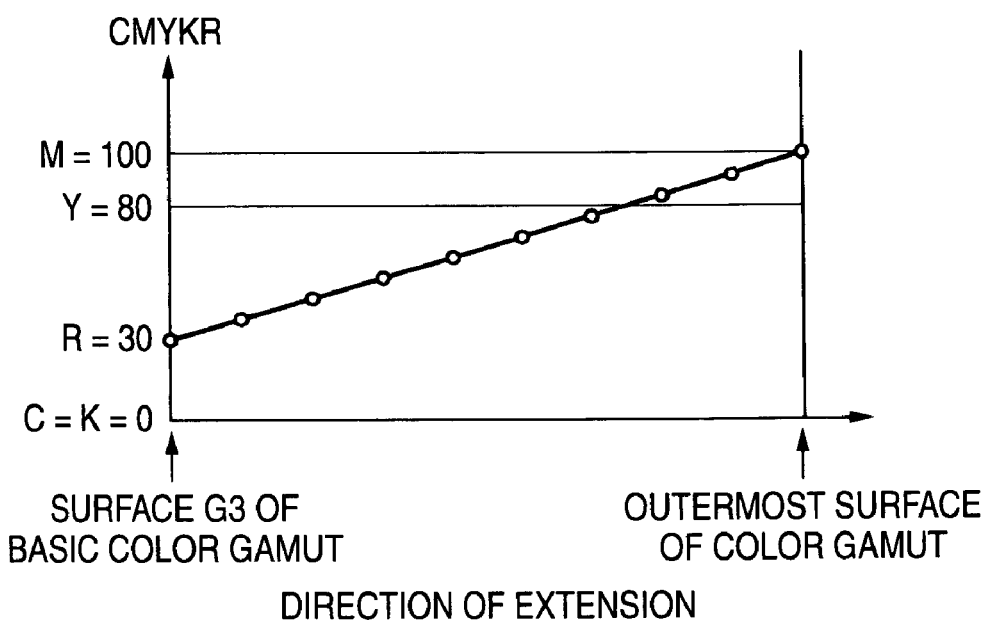
FIG. 17 is a graph for explaining a specific example of the method for extending the basic color gamut by increasing R.

The color gamut regarding the point G3 can be further extended by R. When, for example, R is increased from the point G3, the color gamut can be extended as represented by the arrow extending from the point G3 in FIG. 14. FIG. 17 is a graph for explaining a specific example of the method for extending the basic color gamut by increasing R. In the specific example, the point G3 is set at (C, M, Y, K, R)=(0, 100, 50, 0, 30) and R is increased from R=30 to R=100 on the condition that points C, M, Y and K are fixed. An increasing state of R on this occasion is shown in FIG. 17. The color gamut is extended in the chromaticness increasing direction in accordance with increase in R.

Figure 18:
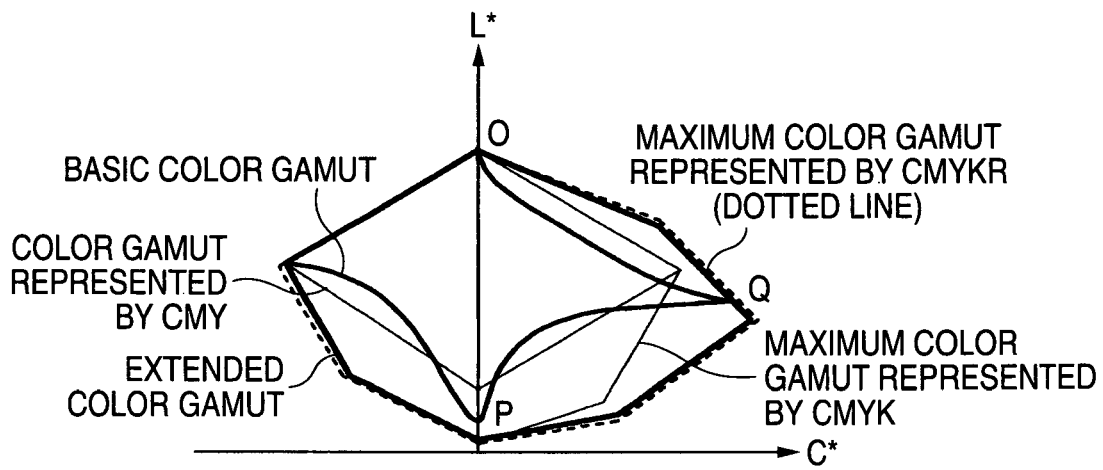
FIG. 18 is a graph for explaining an example of the extended color gamut.

FIG. 18 is a graph for explaining an example of the extended color gamut. When the color gamut is extended from the basic color gamut in the aforementioned manner, the basic color gamut represented by the inner thick line in FIG. 18 can be extended to the color gamut represented by the outer thick line in FIG. 18. The color gamut thus extended is referred to as "extended color gamut". The maximum color gamut allowed to be expressed by CMYKR is represented by the broken line in FIG. 18.

Although extension in directions by use of extra colors K and R has been described above, extension in directions by use of K and G and by use of K and B can be performed in the same manner as described above. Incidentally, a new output color signal generated at the time of extension of the basic color gamut is regarded as extended color gamut CMYKRGB lattice points. As is obvious from the basic color gamut CMYKRGB lattice points generated by the basic color gamut setting section 31 and the extended color gamut CMYKRGB lattice points generated by the extended color gamut setting section 32, it is possible to obtain lattice points in which the color gamut in the CMYKRGB color space can be used sufficiently and in which extra colorants KRGB can be uniquely decided.

Figure 19:
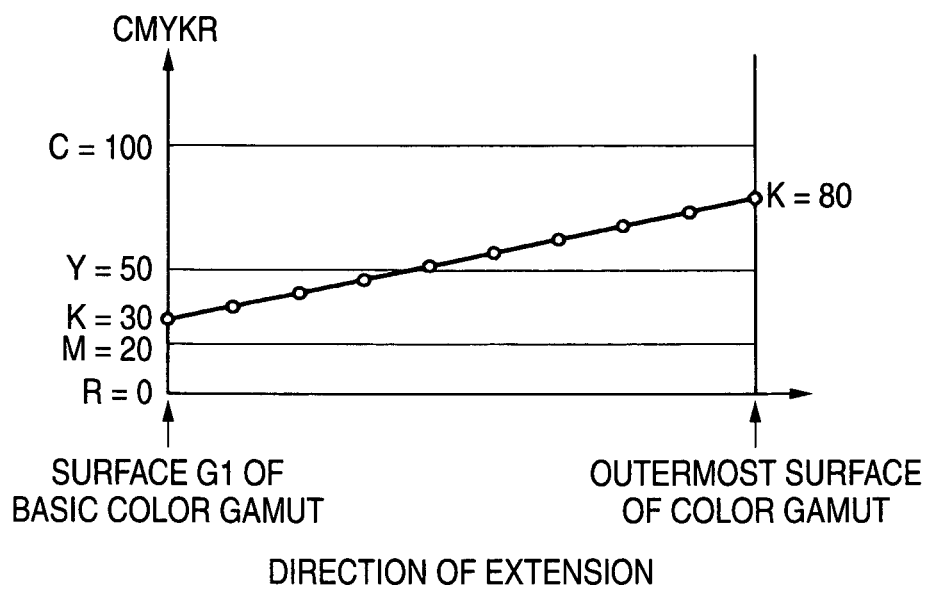
FIG. 19 is a graph for explaining a specific example of the method for extending the basic color gamut by increasing K in the case where the total amount of coloring materials is limited.

When the total amount of coloring materials in the output device is limited, the basic color gamut may be extended by increasing respective coloring materials up to the limited total amount. FIG. 19 is a graph for explaining a specific example of the method for extending the basic color gamut by increasing K when the total amount of coloring materials is limited. In the specific example, the point G1 is set at (C, M, Y, K, R)=(100, 20, 50, 30, 0) and K is increased on the condition that points C, M, Y and R are fixed in the same manner as in the case shown in FIG. 15. When the limited total amount of coloring materials is 280% (that is, limitation of C+M+Y+K+R=280), the surface of the color gamut allowed to be extended is maximized at K=80, which satisfies C+M+Y+K+R=280. In this case, the basic color gamut may be extended by increasing K from K=30 to K=80 as shown in FIG. 19.

Figure 20:
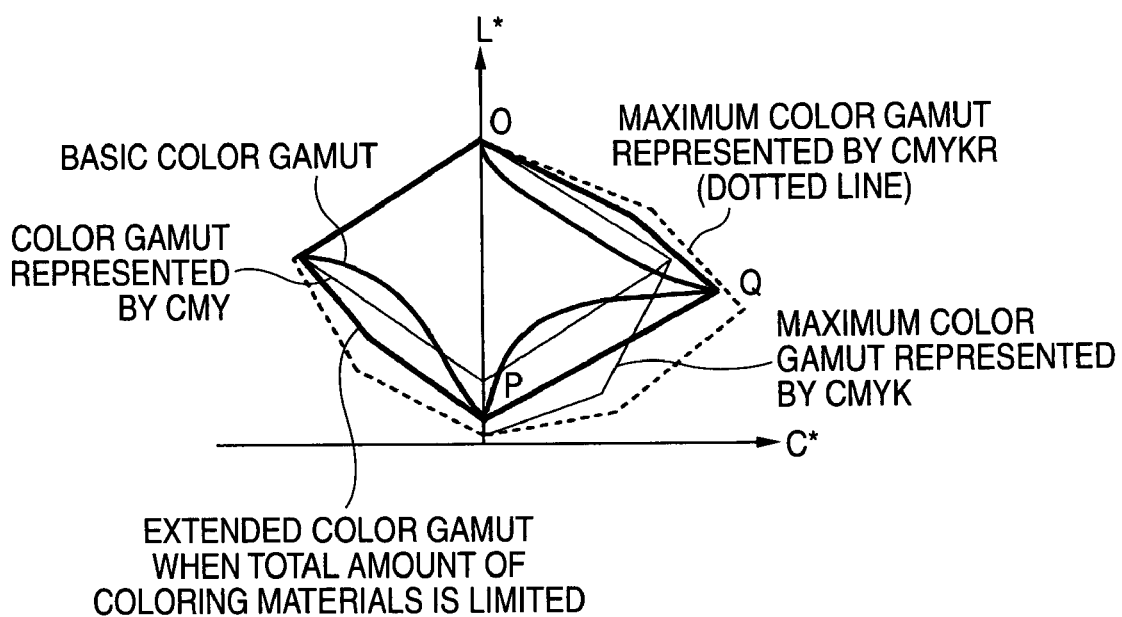
FIG. 20 is a graph for explaining an example of the extended color gamut in the case where the total amount of coloring materials is limited.

The same manner as described above can be applied to the case where K and R are increased as shown in FIG. 16 or to the case where R is increased as shown in FIG. 17. That is, the color gamut may be set so that the outermost surface of the color gamut to be extended satisfies the limited total amount. FIG. 20 is a graph for explaining an example of the extended color gamut when the total amount is limited. For example, the extended color gamut in the case where the total amount of coloring materials in the output device is limited as described above has a surface as shown in FIG. 20, so that the maximum color gamut satisfying the limited total amount of coloring materials can be kept. The method for extending the color gamut in the case where the total amount of coloring materials is limited as described above can be applied to KG and KB.

The color-signal pair generating section 33 of the color gamut setting section 11 converts the basic color gamut CMYKRGB lattice points generated by the basic color gamut setting section 31 and the extended color gamut CMYKRGB lattice points generated by the extended color gamut setting section 32 into the input color signal in the L*a*b* color space. For example, the color-signal pair generating section 33 may perform this conversion by using the following color conversion model.

$$(L^*, a^*, b^*) = F(C, M, Y, K, R, G, B) \quad \text{(Expression 18)}$$

The expression 18 can be modeled from patched data of colors CMYKRGB and pairs of colorimetric values L*a*b* obtained by measuring the patched data by use of a color transmission characteristic prediction method using regression analysis described in JP Hei. 10-262157 A (corresponding to U.S. Pat. No. 6,100,999) and JP 2000-84434 A or by use of a scientific known method using neural networks.

Moreover, extra colorants K, R, G and B of the lattice points, which are conversion sources, are directly associated with L*a*b* of the converted input color signal. As a result, the color-signal pair generating section 33 generates L*a*b*-K color-signal pairs, L*a*b*-R color-signal pairs, L*a*b*-G color-signal pairs and L*a*b*-B color-signal pairs. The color-signal pair generating section 33 generates the color-signal pairs in accordance with the basic color gamut CMYKRGB lattice points and the extended color gamut CMYKRGB lattice points, respectively. The L*a*b*-K color-signal pairs, the L*a*b*-R color-signal pairs, the L*a*b*-G color-signal pairs and the L*a*b*-B color-signal pairs generated thus are delivered to the extra colorant calculation section 12.

The extra colorant calculation section 12 shown in FIG. 3 includes the K calculation section 41, the R calculation section 42, the G calculation section 43 and the B calculation section 44 for calculating extra colorants KRGB. The K calculation section 41 uniquely decides K on the basis of the target color signal (L*a*b*) by referring to the L*a*b*-K color-signal pairs. Similarly, the R calculation section 42 uniquely decides R on the basis of the target color signal by referring to the L*a*b*-R color-signal pairs. The G calculation section 43 uniquely decides G on the basis of the target color signal by referring to the L*a*b*-G color-signal pairs. The B calculation section 44 uniquely decides B on the basis of the target color signal by referring to the L*a*b*-B color-signal pairs. The calculations of K, R, G and B by the K calculation section 41, the R calculation section 42, the G calculation section 43 and the B calculation section 44 may be modeled by use of the respective color-signal pairs as follows.

$$K = f_K(L^*, a^*, b^*) \quad \text{(Expression 19)}$$

$$R = f_R(L^*, a^*, b^*) \quad \text{(Expression 20)}$$

$$G = f_G(L^*, a^*, b^*) \quad \text{(Expression 21)}$$

$$B = f_B(L^*, a^*, b^*) \quad \text{(Expression 22)}$$

Because conversion of each color can be modeled by a known technique in the same manner as in the expression 18 if there is a color-signal pair, K, R, G and B can be uniquely calculated on the basis of the target color signal by use of the color conversion models represented by the expressions 19 to 22. Calculation of extra colorants by use of the color conversion models can be performed speedily compared with the retrieving method according to the related art.

In the primary colorant calculation section 13, values of primary colorants CMY can be calculated in accordance with the following expression on the basis of the target color signal L*a*b* and K, R, G and B calculated by the K calculation section 41, the R calculation section 42, the G calculation section 43 and the B calculation section 44 of the extra colorant calculation section 12 in accordance with the expressions 19 to 22.

$$CMY=F^{-1}(L^*,a^*,b^*,K,R,G,B) \quad \text{(Expression 23)}$$

In the expression 23, $F^{-1}$ may be provided as a model of inversion of the expression 18. An output color signal CMYKRGB corresponding to the target color signal can be obtained on the basis of CMY calculated thus and KRGB calculated by the extra colorant calculation section 12.

In this manner, the output color signal in the CMYKRGB color space which is a seven-dimensional color space can be speedily and uniquely obtained on the basis of the target color signal in the $L^*a^*b^*$ color space which is a three-dimensional color space.

Figure 21:
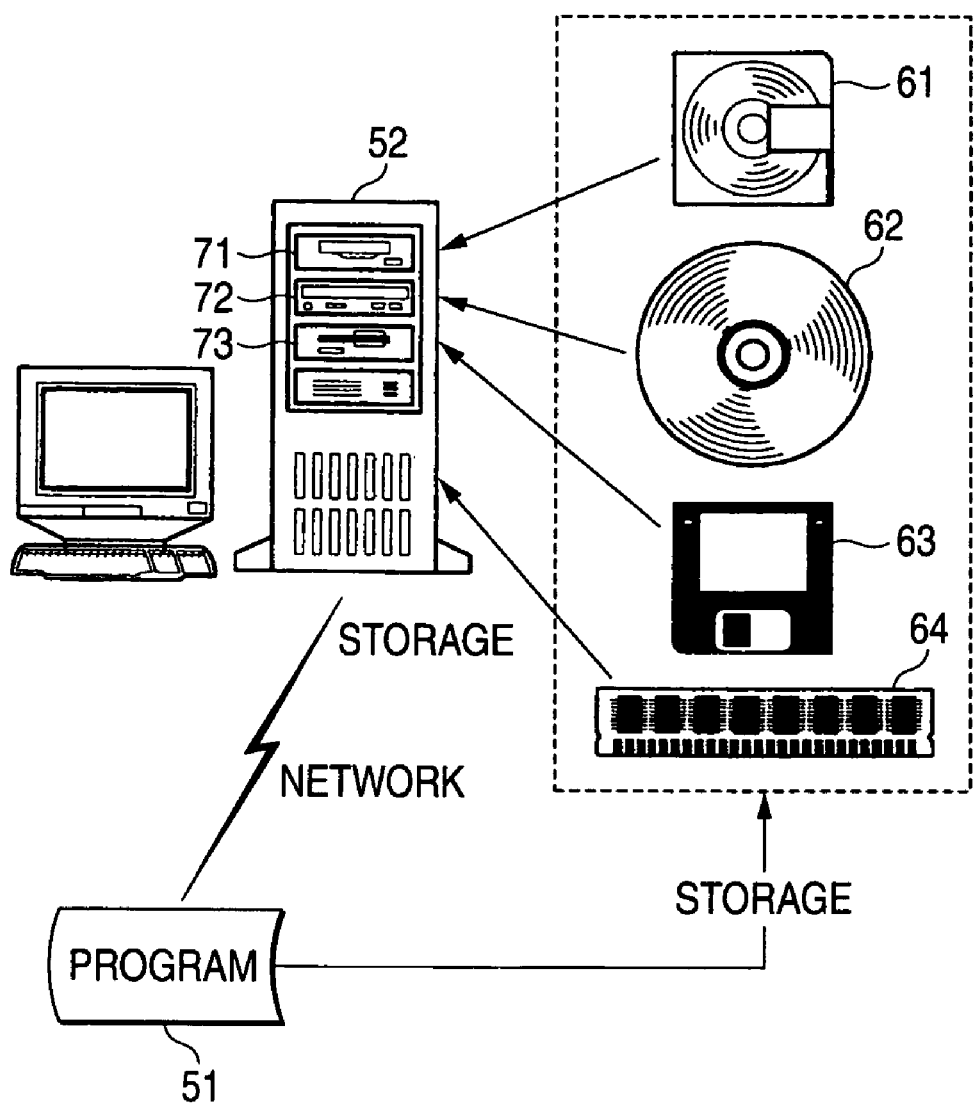
FIG. 21 is a view for explaining an example of a computer program and a recording medium for storing the computer program in the case where the function of the color processing apparatus or color gamut setting apparatus or the color processing method or color gamut setting method is achieved by the computer program.

FIG. 21 is a view for explaining an example of a computer program and a recording medium for storing the computer program in the case were the function of the color processing apparatus or color gamut setting apparatus or the color processing method or color gamut setting method according to the invention is achieved by the computer program. In FIG. 21, the reference numeral 51 designates a program; 52, a computer; 61, an optomagnetic disc; 62, an optical disc; 63, a magnetic disc; 64, a memory; 71, an optomagnetic disc device; 72, an optical disc device; and 73, a magnetic disc device.

Part or all of the function of each portion described in each embodiment can be achieved by the program 51 which can be executed by the computer. In this case, the program 51 and data (inclusive of data of the generated color conversion models) used by the program can be stored in a recording medium which can be read by the computer. The recording medium means a medium in which a state of change in energy such as magnetic energy, optical energy or electric energy is induced in accordance with the contents described in the program so that the contents described in the program can be transmitted in the form of a corresponding signal to a reader provided as a hardware resource of the computer. Examples of the recording medium include the optomagnetic disc 61, the optical disc 62 (inclusive of CD, DVD, etc.), the magnetic disc 63, and the memory 64 (inclusive of an IC card, a memory card, etc.). It is a matter of course that these recording media are not limited to portable media.

The program 51 is stored in these recording media in advance. When, for example, these recording media are mounted in the optomagnetic disc device 71, the optical disc device 72, the magnetic disc device 73 and a not-shown memory slot provided in the computer 52, the program 51 can be read from the computer so that the function of the color processing apparatus or color gamut setting apparatus or the color processing method or color gamut setting method according to the invention can be executed. Alternatively, after a recording medium is mounted in the computer 52 in advance, the program 51 may be transferred to the computer 52, for example, through a network etc. so that the program 51 can be stored in the recording medium and executed.

It is a matter of course that part of the function can be formed by hardware or all of the function may be formed by hardware. Or the program can be formed as a program including the configuration of the color conversion apparatus according to the invention in addition to the other configuration. For example, the program and a control program in a copying machine or an image forming apparatus may be integrated with each other into one program. It is a matter of course that when the program is applied to the other purpose, the program can be integrated with a program used in the purpose. Not only the configuration shown in FIG. 1 can be integrated into one program, but also the invention can be formed from plural program parts. For example, the color gamut setting section 11 may be formed as a separate program as described above. Or a portion which can use the existing technique such as a process for generating a color conversion model may be formed as a separate program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus for converting a target M-dimensional color signal in an input color space into an N-dimensional output color signal in an output color space where M and N are natural numbers and N>M, the apparatus comprising:

a color gamut setting unit comprising software and hardware that sets a color gamut in an output color space to which output color signals belong to, wherein:
    each output color signal comprises primary colorants and extra colorants,
    each output color signal corresponds to an input color signal belonging to an input color space, and
    the extra colorants of each output color signal is uniquely associated with the corresponding input color signal in the set color gamut;
wherein the color gamut setting unit comprises:
a first setting unit comprising software and hardware that sets a basic color gamut in the output color space, the basic color gamut in which each input color signal corresponding to the output color signal comprising the primary colorants and the extra colorants is associated with the extra colorants of the corresponding output color signal so that a phase of the input color signal corresponding to a color signal comprising the primary colorants of the corresponding output color signal is preserved; and
a second setting unit comprising software and hardware that sets an extended color gamut by at least one of (i) increasing the extra colorants of the output color signals from a surface of the basic color gamut and (ii) decreasing the primary colorants of the output color signals on the surface of the basic color gamut, and
in the extended color gamut, each input color signal is uniquely associated with the extra colorants of the corresponding output color signal;
a first calculation unit comprising software and hardware that uniquely calculates (N−M) colorants of the converted output color signal from the target color signal with using plural color-signal pairs, in each pair, corresponding one of the (N−M) colorants of an output color signal in the output color space are associated with an input color signal in the input color space; and
a second calculation unit comprising software and hardware that calculates the remaining M colorants of the converted output color signal from the target color signal and the (N−M) colorants of the converted output color signal calculated by the first calculation unit.

2. The apparatus according to claim 1, wherein in each of the color-signal pairs, corresponding one of the (N−M) colorants of the output color signal is associated with the input color signal, which corresponds to the output color signal in a color gamut set in the output color space.

3. The apparatus according to claim 2, wherein:
each color signal in the input color space signal includes at least three colorants,
the M colorants of the converted output color signal includes cyan, magenta and yellow, and
the (N−M) colorants of the converted output color signal includes at least one selected from the group comprising black, red, green and yellow.

4. The apparatus according to claim 2, wherein the input color signal of each color-signal pair is a color signal into which the associated output color signal in the color gamut set in the output color space is converted.

5. The apparatus according to claim 4, wherein:
the extended color gamut set by the color gamut setting apparatus is used as a color gamut set in the output color space.

6. The apparatus according to claim 1, wherein:
the N colorants of the converted output color signal include primary colorants and at least one extra colorant.

7. The apparatus according to claim 6, wherein in each of the color-signal pairs, corresponding one of the extra colorants of the output color signal is associated with the input color signal, which corresponds to the output color signal in a color gamut set in the output color space.

8. A color gamut setting apparatus comprising:
a color gamut setting unit comprising software and hardware that sets a color gamut in an output color space to which output color signals belong to, wherein:
each output color signal comprises primary colorants and extra colorants,
each output color signal corresponds to an input color signal belonging to an input color space, and
the extra colorants of each output color signal is uniquely associated with the corresponding input color signal in the set color gamut; wherein
the color gamut setting unit comprises:
a first setting unit comprising software and hardware that sets a basic color gamut in the output color space, the basic color gamut in which each input color signal corresponding to the output color signal comprising the primary colorants and the extra colorants is associated with the extra colorants of the corresponding output color signal so that a phase of the input color signal corresponding to a color signal comprising the primary colorants of the corresponding output color signal is preserved; and
a second setting unit comprising software and hardware that sets an extended color gamut by at least one of (i) increasing the extra colorants of the output color signals from a surface of the basic color gamut and (ii) decreasing the primary colorants of the output color signals on the surface of the basic color gamut, and
in the extended color gamut, each input color signal is uniquely associated with the extra colorants of the corresponding output color signal.

9. The apparatus according to claim 8, wherein:
the first setting unit sets the basic color gamut by at least one of:
(i) increasing at least one of the extra colorants of the output color signals, which extends a color gamut in a low-brightness direction, in accordance with increase in a sum of the primary colorants, and
(ii) decreasing the at least one of the extra colorants of the output color signals, which extends the color gamut in the low-brightness direction, in accordance with increase in a value representing hue of a color comprising the primary colorants of the output color signal.

10. The apparatus according to claim 8, wherein the first setting unit sets the basic color gamut by at least one of:
(i) increasing the extra colorants in accordance with increase in a sum of chroma-increasing colorants of the primary colorants,
(ii) decreasing the extra colorants in accordance with increase in difference between the chroma-increasing colorants of the primary colorants, and
(iii) decreasing the extra colorants in accordance with increase in chroma-decreasing colorants of the primary colorants.

11. The apparatus according to claim 8, wherein the second setting unit sets the extended color gamut by increasing at least one of the extra colorants toward the low-brightness direction from the surface of the basic color gamut.

12. The apparatus according to claim 8, wherein the second setting unit sets the extended color gamut by increasing at least one of the extra colorants toward the high-chroma direction from the surface of the basic color gamut.

13. The apparatus according to claim 8, wherein the second setting unit controls the extended color gamut between the surface of the basic color gamut and a surface of a maximum extended color gamut, which is allowed to be extended to utmost from the surface of the basic color gamut.

14. The apparatus according to claim 13, wherein the maximum extended color gamut is a maximum color gamut in which a sum of colorants of each color signal satisfies a predetermined limited total amount of coloring materials.

15. The apparatus according to claim 8, wherein the first setting unit and the second setting unit set the basic color gamut and the extended color gamut so that a sum of the primary colorants and the extra colorants satisfies a predetermined limited total amount of coloring materials.

16. The apparatus according to claim 8, wherein:
the primary colorants include cyan, magenta and yellow, and
the extra colorants include at least one of black, red, green and blue.

17. The apparatus according to claim 16, wherein:
the first setting unit sets the basic color gamut by at least one of:
(i) increasing black in accordance with increase in a sum of cyan, magenta and yellow, and
(ii) decreasing black, in accordance with increase in a value representing hue of a color including cyan, magenta and yellow.

18. The apparatus according to claim 16, wherein:
the first setting unit sets the basic color gamut by at least one of:
(i) increasing red in accordance with increase in a sum of magenta and yellow,
(ii) decreasing red in accordance with increase in a difference between magenta and yellow, and
(iii) decreasing red in accordance with increase in cyan.

19. The apparatus according to claim 16, wherein:
the first setting unit sets the basic color gamut by at least one of:
(i) increasing green in accordance with increase in a sum of cyan and yellow, (ii) decreasing green in accordance with increase in a difference between cyan and yellow, and
(iii) decreasing green in accordance with increase in magenta.

20. The apparatus according to claim 16, wherein:
the first setting unit sets the basic color gamut by at least one of:
(i) increasing blue in accordance with increase in a sum of cyan and magenta,
(ii) decreasing blue in accordance with increase in a difference between cyan and magenta, and
(iii) decreasing blue in accordance with increase in yellow.

21. The apparatus according to claim 16, wherein the second setting unit increases at least one of black, red, green and blue from a surface of the basic color gamut.

22. The apparatus according to claim 16, wherein the second setting unit controls the extended color gamut between the surface of the basic color gamut and a surface of a maximum extended color gamut, which is allowed to be extended to utmost from the surface of the basic color gamut.

23. A non-transitory computer readable medium storing a program causing a computer to execute a process for converting a target M-dimensional color signal in an input color space into an N-dimensional output color signal in an output color space where M and N are natural numbers and N>M, the process comprising:
setting a color gamut in an output color space to which output color signals belong to, wherein:
each output color signal comprises primary colorants and extra colorants,
each output color signal corresponds to an input color signal belonging to an input color space, and
the extra colorants of each output color signal is uniquely associated with the corresponding input color signal in the set color gamut;
wherein the setting of the color gamut comprises:
setting a basic color gamut in the output color space, the basic color gamut in which each input color signal corresponding to the output color signal comprising the primary colorants and the extra colorants is associated with the extra colorants of the corresponding output color signal so that a phase of the input color signal corresponding to a color signal comprising the primary colorants of the corresponding output color signal is preserved; and
setting an extended color gamut by at least one of (i) increasing the extra colorants of the output color signals on a surface of the basic color gamut and (ii) decreasing the primary colorants of the output color signals on the surface of the basic color gamut, and
in the extended color gamut, each input color signal is uniquely associated with the extra colorants of the corresponding output color signal;
uniquely calculating (N−M) colorants of the converted output color signal from the target color signal with using plural color-signal pairs, in each pair, corresponding one of the (N−M) colorants of an output color signal in the output color space are associated with an input color signal in the input color space; and
calculating the M colorants of the converted output color signal from the target color signal and the (N−M) colorants of the converted output color signal calculated.

24. A non-transitory computer readable medium storing a program causing a computer to execute a process for setting a color gamut, the process comprising:
setting the color gamut in an output color space to which output color signals belong to, wherein:
each output color signal comprises three primary colorants and at least two extra colorants,
each output color signal corresponds to an input color signal belonging to an input color space, and
the extra colorants of each output color signal is uniquely associated with the corresponding input color signal in the set color gamut;
wherein the setting of the color gamut comprises:
setting a basic color gamut in the output color space, the basic color gamut in which each input color signal corresponding to the output color signal comprising the primary colorants and the extra colorants is associated with the extra colorants of the corresponding output color signal so that a phase of the input color signal corresponding to a color signal comprising the primary colorants of the corresponding output color signal is preserved; and
setting an extended color gamut by at least one of (i) increasing the extra colorants of the output color signals on a surface of the basic color gamut and (ii) decreasing the primary colorants of the output color signals on the surface of the basic color gamut, and
in the extended color gamut, each input color signal is uniquely associated with the extra colorants of the corresponding output color signal.

* * * * *